United States Patent
Shin et al.

(10) Patent No.: US 12,283,712 B2
(45) Date of Patent: Apr. 22, 2025

(54) BATTERY PACK AND VEHICLE INCLUDING THE SAME

(71) Applicant: LG ENERGY SOLUTION, LTD., Seoul (KR)

(72) Inventors: Ju-Hwan Shin, Daejeon (KR); Sung-Hoon Woo, Daejeon (KR); Myung-Ki Park, Daejeon (KR); Won-Kyoung Park, Daejeon (KR); Jun-Yeob Seong, Daejeon (KR); Tae-Kyeong Lee, Daejeon (KR); Hyoung-Suk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/711,744

(22) PCT Filed: Dec. 27, 2022

(86) PCT No.: PCT/KR2022/021430
§ 371 (c)(1),
(2) Date: May 20, 2024

(87) PCT Pub. No.: WO2023/128574
PCT Pub. Date: Jul. 6, 2023

(65) Prior Publication Data
US 2024/0332725 A1    Oct. 3, 2024

(30) Foreign Application Priority Data
Dec. 27, 2021    (KR) ........................ 10-2021-0188984

(51) Int. Cl.
*H01M 50/367* (2021.01)
*H01M 50/249* (2021.01)
(Continued)

(52) U.S. Cl.
CPC ....... *H01M 50/367* (2021.01); *H01M 50/249* (2021.01); *H01M 50/271* (2021.01); *H01M 50/383* (2021.01)

(58) Field of Classification Search
CPC ............ H01M 50/367; H01M 50/249; H01M 50/271; H01M 50/383
See application file for complete search history.

(56) References Cited

U.S. PATENT DOCUMENTS

| | | |
|---|---|---|
| 2020/0058973 A1 | 2/2020 | Golubkov |
| 2022/0263180 A1 | 8/2022 | Huang et al. |
| | (Continued) | |

FOREIGN PATENT DOCUMENTS

| | | |
|---|---|---|
| CN | 109088122 A | 12/2018 |
| CN | 110444835 A | 11/2019 |
| | (Continued) | |

OTHER PUBLICATIONS

International Search Report for PCT/KR2022/021430 (PCT/ISA/210) mailed on Apr. 11, 2023.
(Continued)

*Primary Examiner* — Daniel S Gatewood
(74) *Attorney, Agent, or Firm* — Birch, Stewart, Kolasch & Birch, LLP

(57) ABSTRACT

A battery pack discharges a high-temperature gas to the outside of the battery pack without affecting other adjacent battery modules when the gas is generated inside the battery module. The battery pack includes a pack housing; a battery module; and a pack cover having a first center venting channel, a first side venting channel, a second center venting channel and a second side venting channel configured to guide a venting gas generated from the battery module at a (Continued)

position corresponding to the battery module, the pack cover being configured to cover the battery modules by being coupled to the pack housing.

23 Claims, 18 Drawing Sheets

(51) Int. Cl.
*H01M 50/271* (2021.01)
*H01M 50/383* (2021.01)

(56) References Cited

U.S. PATENT DOCUMENTS

| | | | |
|---|---|---|---|
| 2022/0311088 A1 | 9/2022 | Ryu et al. | |
| 2023/0198102 A1* | 6/2023 | Tan | H01M 10/6561 307/9.1 |

FOREIGN PATENT DOCUMENTS

| | | | | |
|---|---|---|---|---|
| CN | 110739424 | A | 1/2020 | |
| CN | 112652857 | A | 4/2021 | |
| CN | 113809479 | A | 12/2021 | |
| CN | 113826276 | A | 12/2021 | |
| JP | 2011-70872 | A | 4/2011 | |
| KR | 10-2012-0040647 | A | 4/2012 | |
| KR | 10-2016-0078044 | A | 7/2016 | |
| KR | 10-2019-0086853 | A | 7/2019 | |
| KR | 10-2019-0087744 | A | 7/2019 | |
| KR | 10-2021-0127316 | A | 10/2021 | |
| KR | 10-2021-0133535 | A | 11/2021 | |
| WO | WO 2021/073430 | A1 | 4/2021 | |
| WO | WO-2021238379 | A1 * | 12/2021 | B60L 50/64 |

OTHER PUBLICATIONS

Written Opinion of the International Searching Authority for PCT/KR2022/021430 (PCT/ISA/237) mailed on Apr. 11, 2023.
Extended European Search Report for European Application No. 22916715.0, dated Dec. 6, 2024.

* cited by examiner

BATTERY PACK AND VEHICLE INCLUDING THE SAME

TECHNICAL FIELD

The present disclosure relates to a battery pack and a vehicle including the same, and more specifically, to a battery pack configured to discharge a high-temperature gas to the outside of the battery pack without affecting other adjacent battery modules when the gas is generated inside the battery module, and a vehicle including the same.

The present application claims priority to Korean Patent Application No. 10-2021-0188984 filed on Dec. 27, 2021 in the Republic of Korea, the disclosures of which are incorporated herein by reference.

BACKGROUND ART

As the demand for portable electronic products such as notebooks, video cameras, and mobile phones rapidly increases and the commercialization of robots and electric vehicles begins in earnest, research on high-performance secondary batteries capable of repeated charging and discharging is being actively conducted.

Currently commercialized secondary batteries include nickel cadmium batteries, nickel hydrogen batteries, nickel zinc batteries, and lithium secondary batteries. Among them, lithium secondary batteries are in the limelight because of their advantages of free charge and discharge, very low self-discharge rate, and high energy density, as the memory effect hardly occurs compared to nickel-based secondary batteries.

These lithium secondary batteries mainly use a lithium-based oxide and a carbon material as a positive electrode active material and a negative electrode active material, respectively. A lithium secondary battery includes an electrode assembly in which a positive electrode plate and a negative electrode plate coated with such a positive electrode active material and a negative electrode active material, respectively, are disposed with a separator therebetween, and an exterior material, that is, a battery case for sealing and accommodating the electrode assembly together with an electrolyte.

In general, lithium secondary batteries may be classified into a can-type secondary battery in which an electrode assembly is embedded in a metal can and a pouch-type secondary battery in which an electrode assembly is embedded in a pouch of an aluminum laminate sheet, depending on the shape of the exterior material.

Recently, secondary batteries have been widely used for driving or energy storage not only in small devices such as portable electronic devices, but also in medium and large-sized devices such as electric vehicles and energy storage systems (ESSs). Many of these secondary batteries may be accommodated together inside a module case in a state of being electrically connected, which may configure one battery module, and such battery modules may be electrically connected again in a narrow space to increase energy density, which configures a battery pack.

However, when a plurality of battery modules exist in a dense state in a narrow space as above, they may be vulnerable to accidents such as fire or explosion. For example, when an event such as thermal runaway occurs in one battery module, high-temperature gas may be discharged from the battery module. If this gas is not properly discharged to the outside of the battery pack, it may be propagated to other battery modules provided inside the battery pack, which may cause a chain reaction. Also, in this case, the pressure inside the battery pack increases, and there is a possibility of explosion. When the battery pack explodes, not only great damage may be caused to nearby devices or users due to the pressure of the explosion, but also the range and speed of damage may be further increased. Therefore, it is required to develop a battery pack having a structure that allows the high-temperature gas to be safely discharged to the outside of the battery pack without affecting other adjacent battery modules when an abnormality occurs in some battery modules and a gas is discharged.

DISCLOSURE

Technical Problem

The present disclosure is designed to solve the problems of the related art, and therefore the present disclosure is directed to controlling the flow of a venting gas in a desired direction by adding an additional venting channel formation structure to an existing battery pack.

In another aspect, the present disclosure is directed to allowing the high-temperature venting gas ejected when a thermal event occurs in some battery modules to be safely discharged to the outside of the battery pack without affecting other battery modules inside the battery pack.

However, the technical problem to be solved by the present disclosure is not limited to the above-mentioned problems, and other problems not mentioned will be clearly understood by those skilled in the art from the description below.

Technical Solution

In one aspect of the present disclosure, there is provided a battery pack comprising: a pack housing having a first accommodation space, a second accommodation space spaced apart from the first accommodation space, a center space formed between the first accommodation space and the second accommodation space, and a first side space spaced apart from the center space and located adjacent to the first accommodation space, and a second side space spaced apart from the center space and located adjacent to the second accommodation space; a first battery module group including a plurality of battery modules disposed within the first accommodation space; a second battery module group including a plurality of battery modules disposed within the second accommodation space; and a pack cover having a first center venting channel configured to guide a venting gas generated from at least two battery modules of the first battery module group to the center space, a first side venting channel configured to guide a venting gas generated from remaining battery modules of the first battery module group to the first side space, and a second center venting channel configured to guide a venting gas generated from at least two battery modules of the second battery module group to the center space, and a second side venting channel configured to guide a venting gas generated from remaining battery modules of the second battery module group to the second side space.

The first battery module group may include a first battery module and a second battery module adjacent to each other. The first center venting channel may be configured to guide a venting gas generated from the first battery module, and the first side venting channel may be configured to guide a venting gas generated from the second battery module.

The second battery module group may include a third battery module and a fourth battery module adjacent to each other.

The second center venting channel may be configured to guide a venting gas generated from the third battery module, and the second side venting channel may be configured to guide a venting gas generated from the fourth battery module.

The first battery module group may include a first battery module and a second battery module adjacent to each other, and the second battery module group may include a third battery module facing the first battery module and a fourth battery module facing the second battery module.

The first center venting channel may be configured to guide a venting gas generated from the first battery module, and the second side venting channel may be configured to guide a venting gas generated from the third battery module.

The first side venting channel may be configured to guide a venting gas generated from the second battery module, and the second center venting channel may be configured to guide a venting gas generated from the fourth battery module and wherein the first battery module and third battery module are at an end of the first battery module group and second battery module group, respectively.

The battery pack may include a first barrier between a pair of battery modules adjacent to each other in the first battery module group and between a pair of battery modules adjacent to each other in the second battery module group, respectively.

In the inner space of the pack housing, the battery pack may include a second barrier between the first side venting channel and the center space, between the first center venting channel and the first side space, between the second side venting channel and the center space, and between the second center venting channel and the second side space, respectively.

The battery pack may include a third barrier in the center space configured to prevent direct communication between the first center venting channel and the second center venting channel.

The first barrier may be configured to block the movement of a venting gas between the accommodation spaces of battery modules adjacent to each other in the first battery module group and the movement of a venting gas between the accommodation spaces of battery modules adjacent to each other in the second battery module group.

The second barrier may be configured to block the movement of a venting gas between the first side venting channel and the center space, between the first center venting channel and the first side space, between the second side venting channel and the center space, and between the second center venting channel and the second side space.

A sealing member may be provided between the first barrier and at least one of the pack cover and the pack housing.

The pack cover may include a cover plate covering the accommodation space of the pack housing; and a channel plate coupled to an inner surface of the cover plate and having the first side venting channel, the second side venting channel, the first center venting channel, and the second center venting channel.

The pack housing may have a gas collection space formed in at least one of a first side and a second side.

The gas collection space may communicate with the first side venting channel, the second side venting channel, the first center venting channel and the second center venting channel.

The pack housing may have a vent configured to allow the venting gas in the gas collection space to be discharged to outside of the pack housing.

The first side venting channel, the second side venting channel, the first center venting channel and the second center venting channel may have a groove shape formed on an inner surface of the pack cover.

The first side venting channel, the second side venting channel, the first center venting channel and the second center venting channel each may have a groove shape formed on a first surface of the channel plate, respectively.

A second surface of the channel plate opposite to the first surface may be coupled on the inner surface of the cover plate.

The first side venting channel, the second side venting channel, the first center venting channel and the second center venting channel may be provided in plurality along an extension direction of the first side space and the second side space, respectively.

A vehicle according to an embodiment of the present disclosure for achieving the above object includes the battery pack according to the present disclosure.

The battery modules of the first battery module group may be spaced from each other in a first direction and second battery module group are spaced from each other in the first direction, wherein the first battery module group and second battery module group are spaced from each other in a second direction, and wherein battery modules of the first battery module group and second battery module group opposite each other in the second direction vent in opposite directions.

The battery modules of the first battery module group may be spaced from each other in a first direction and second battery module group are spaced from each other in the first direction, wherein the first battery module group and second battery module group are spaced from each other in a second direction, and wherein battery modules of the first battery module group and second battery module group opposite each other in the second direction vent in a same direction.

A first serpentine divider may extend through the plurality of battery modules of the first battery module group, and a second serpentine divider may extend through the plurality of battery modules of the second battery module group.

Advantageous Effects

According to one aspect of the present disclosure, a function for controlling the flow of a venting gas may be added by creating a venting channel in a pack cover that is used only for covering the pack housing in a general case. Specifically, according to this configuration of the present disclosure, when a thermal event occurs in each battery module, a flame and a venting gas move to the first side space, the second side space and the center space along the first center venting channel, the first side venting channel, the second center venting channel and the second side venting channel formed between the upper part of the battery module and the inner surface of the pack cover, thereby significantly reducing the possibility of the thermal event spreading toward adjacent battery modules. In addition, the temperature of the venting gas may drop while the venting gas moves, and even when a flame is generated together with the venting gas, the intensity of the flame may decrease while the flame is moving along the venting channel. Accordingly, it is possible to remove or reduce damage that may occur due to the ejection of high-temperature venting gas and flame to the outside.

According to another aspect of the present disclosure, by configuring different venting channels between adjacent battery modules within the same battery module group, the effect of high-temperature flame and venting gas generated from adjacent battery modules on other battery modules may be minimized. In configuring the battery pack, an effective venting channel may be configured according to the size of the battery pack and the arrangement of battery modules.

According to another aspect of the present disclosure, the venting gas does not move between the accommodation spaces of battery modules adjacent to each other in the first battery module group and between accommodation spaces of battery modules adjacent to each other in the second battery module group due to the first barrier, but moves through the first center venting channel, the first side venting channel, the second center venting channel, and the second side venting channel. The venting gas moved in this way moves again through the first side space, the center space, and the second side space. During this movement, the temperature of the venting gas may decrease and the intensity of the flame may be weakened. When the first barrier and/or the second barrier has an approximate beam shape with an empty inner space, the weight may be reduced while maintaining rigidity. The empty space formed in the first barrier and/or the second barrier may be used as a space for accommodating electrical components required for the battery module. The electrical components may be protected from physical impact by the first barrier and/or the second barrier.

According to another aspect of the present disclosure, the effect of preventing the venting gas from moving into the gap between the barrier and the pack cover and/or the pack housing may be further improved.

According to another aspect of the present disclosure, when the cover plate and the channel plate do not have an integrated form but are provided as separate parts and coupled, a pack cover of a general form without a venting channel may be used as it is. When manufacturing a pack cover, production efficiency may be increased by manufacturing plates separately and then combining them with each other. On the other hand, when the venting channel is formed on the inner surface of the pack cover as described above, it is possible to minimize the decrease in the accommodation space inside the pack housing due to the formation of the venting channel.

According to another aspect of the present disclosure, when a large amount of gas is generated at once to increase the internal pressure of the battery pack, the internal pressure of the battery pack may be quickly reduced through a gas collection space. The gas may be discharged in an intended direction through the venting device, and even if a lot of venting gas is instantaneously generated, the gas may be discharged more rapidly and smoothly by increasing the process capacity or number of venting devices.

According to another aspect of the present disclosure, space efficiency may be increased in a secondary battery where energy density is important because a groove may be formed without a separate member for forming a venting channel on the inner surface of the pack cover or the channel plate. This may be implemented more easily, compared to coupling a separate member for forming a venting channel to the pack cover or the channel plate, thereby securing easy production.

In addition, the present disclosure may have various other effects, which will be described in each embodiment, or descriptions of effects that can be easily inferred by those skilled in the art will be omitted.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
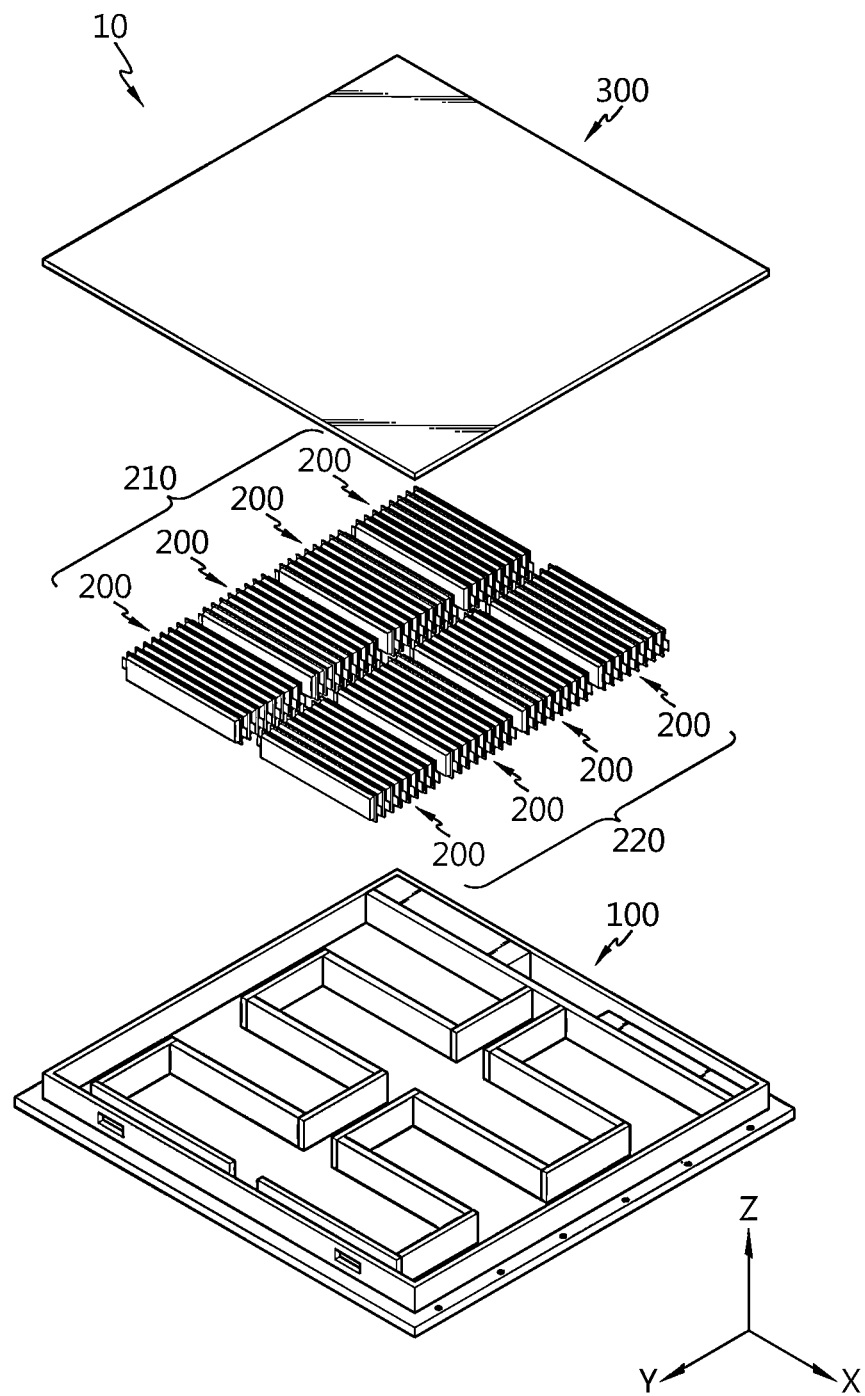
FIG. 1 is an exploded perspective view showing a battery pack according to an embodiment of the present disclosure.

Hereinafter, preferred embodiments of the present disclosure will be described in detail with reference to the accompanying drawings. The accompanying drawings illustrate a preferred embodiment of the present disclosure and together with the foregoing disclosure, serve to provide further understanding of the technical features of the present disclosure, and thus, the present disclosure is not construed as being limited to the drawing. Like reference signs designate like components. Also, in the drawings, the thickness, ratio, and dimensions of components may be exaggerated for effective description of technical content.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In this specification, terms indicating directions such as up, down, left, right, front, and back are used, but these terms are only for convenience of explanation, and it is apparent to those skilled in the art that the terms may vary depending on the location of the target object or the location of the observer.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
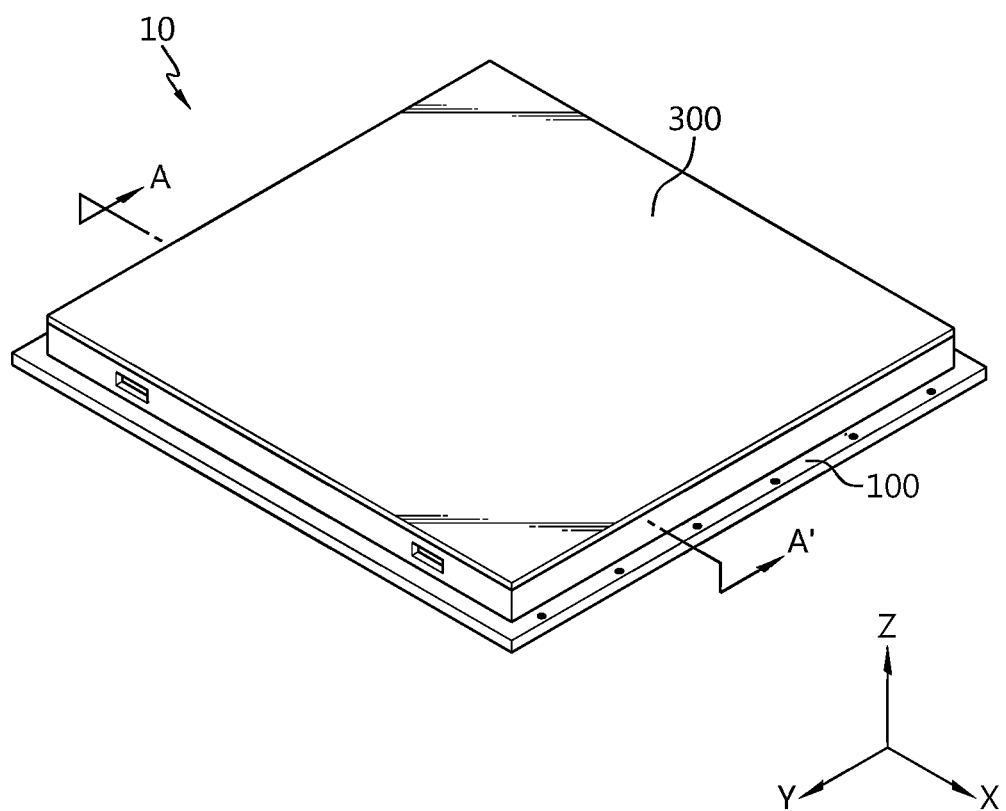
FIG. 2 is a perspective view showing the appearance of a battery pack according to an embodiment of the present disclosure.
Figure 3:
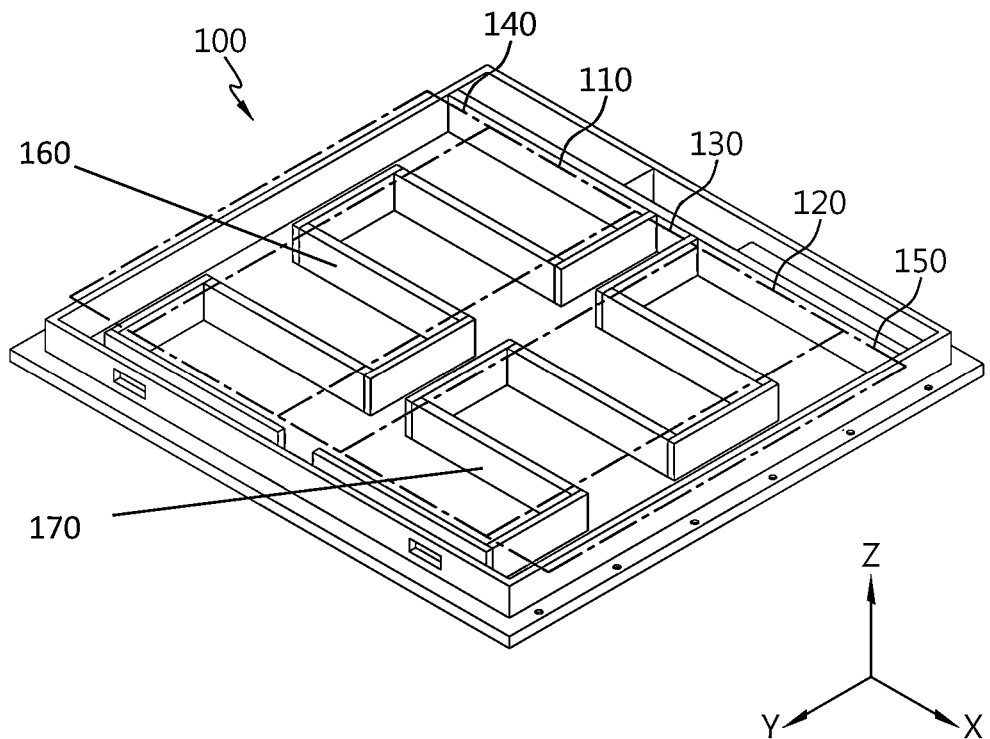
FIG. 3 is a diagram showing the inner space of a pack housing included in the battery pack according to an embodiment of the present disclosure.

FIG. 1 is an exploded perspective view showing a battery pack according to an embodiment of the present disclosure. FIG. 2 is a perspective view showing the appearance of a battery pack according to an embodiment of the present disclosure. FIG. 3 is a diagram showing the inner space of a pack housing included in the battery pack according to an embodiment of the present disclosure.

Referring to FIGS. 1 to 3, the battery pack according to the present disclosure includes a pack housing 100, a first battery module group 210, a second battery module group 220, and a pack cover 300.

The pack housing 100 may include a first accommodation space 110, a second accommodation space 120 spaced apart from the first accommodation space 110, a center space 130 formed between the first accommodation space 110 and the second accommodation space 120, a first side space 140 spaced apart from the center space 130 and located adjacent to the first accommodation space 110, and a second side space 150 spaced apart from the center space 130 and located adjacent to the second accommodation space 120. The first accommodation space 110 may be disposed to face the second accommodation space 120 with the center space 130 interposed therebetween. The first side space 140 may be disposed to face the center space 130 with the first accommodation space 110 interposed therebetween and have a first serpentine divider 160. The second side space 150 may be disposed to face the center space 130 with the second accommodation space 120 interposed therebetween and have a second serpentine divider 170.

The first battery module group 210 may include a plurality of battery modules 200 disposed in the first accommodation space 110. The second battery module group 220 may include a plurality of battery modules 200 disposed within the second accommodation space 120. For example, as shown in FIG. 1, the first battery module group 210 may include four battery modules 200, and the second battery module group 220 may include four battery modules 200.

Figure 4:
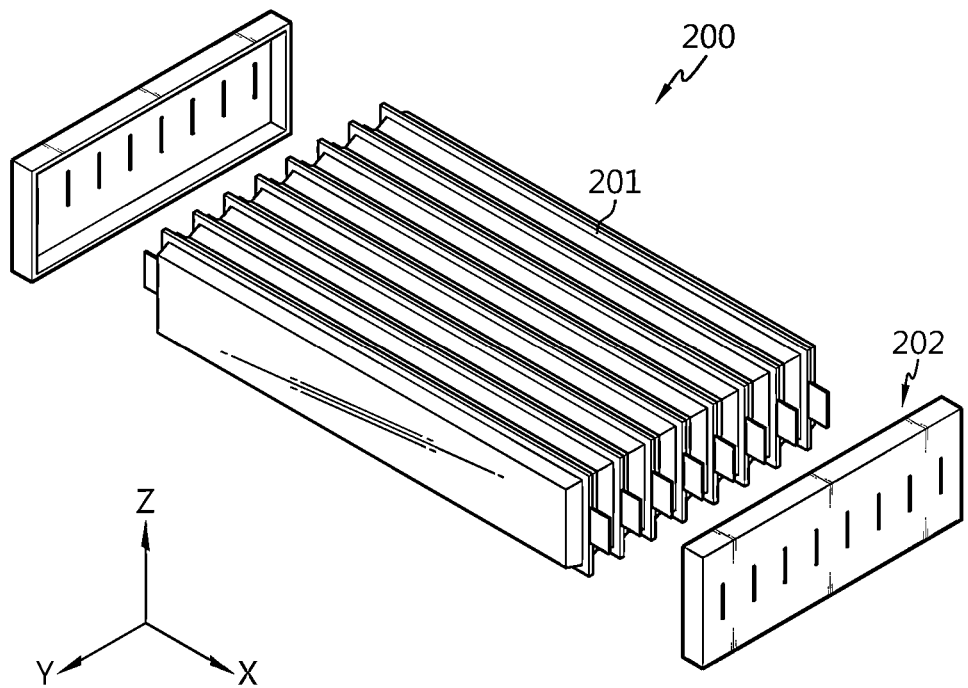
FIG. 4 is a diagram showing a battery module included in the battery pack according to an embodiment of the present disclosure.

FIG. 4 is a diagram showing a battery module included in the battery pack according to an embodiment of the present disclosure.

Referring to FIG. 4, the battery module 200 may include a battery cell 201. The battery cells 201 may be provided in plurality. The battery cell 201 may mean a secondary battery. The battery cell 201 may include an electrode assembly, an electrolyte, a battery case accommodating the electrode assembly and the electrolyte, and a pair of electrode leads connected to the electrode assembly and drawn out of the battery case. The battery cell 201 may be, for example, a pouch-type secondary battery. However, other types of secondary batteries, such as a cylindrical battery or prismatic battery, may also be employed as the battery cell 201 of the present disclosure.

When the battery cell 201 is provided in plurality, the plurality of battery cells 201 may be electrically connected. The battery module 200 may further include a bus bar frame assembly 202 for electrically connecting the plurality of battery cells 201 to each other. The bus bar frame assembly 202 may be provided in a pair, for example. In this case, the pair of bus bar frame assemblies 202 may be coupled to one side and the other side of the longitudinal direction (direction parallel to X axis) of the battery cell 201, respectively.

Figure 5:
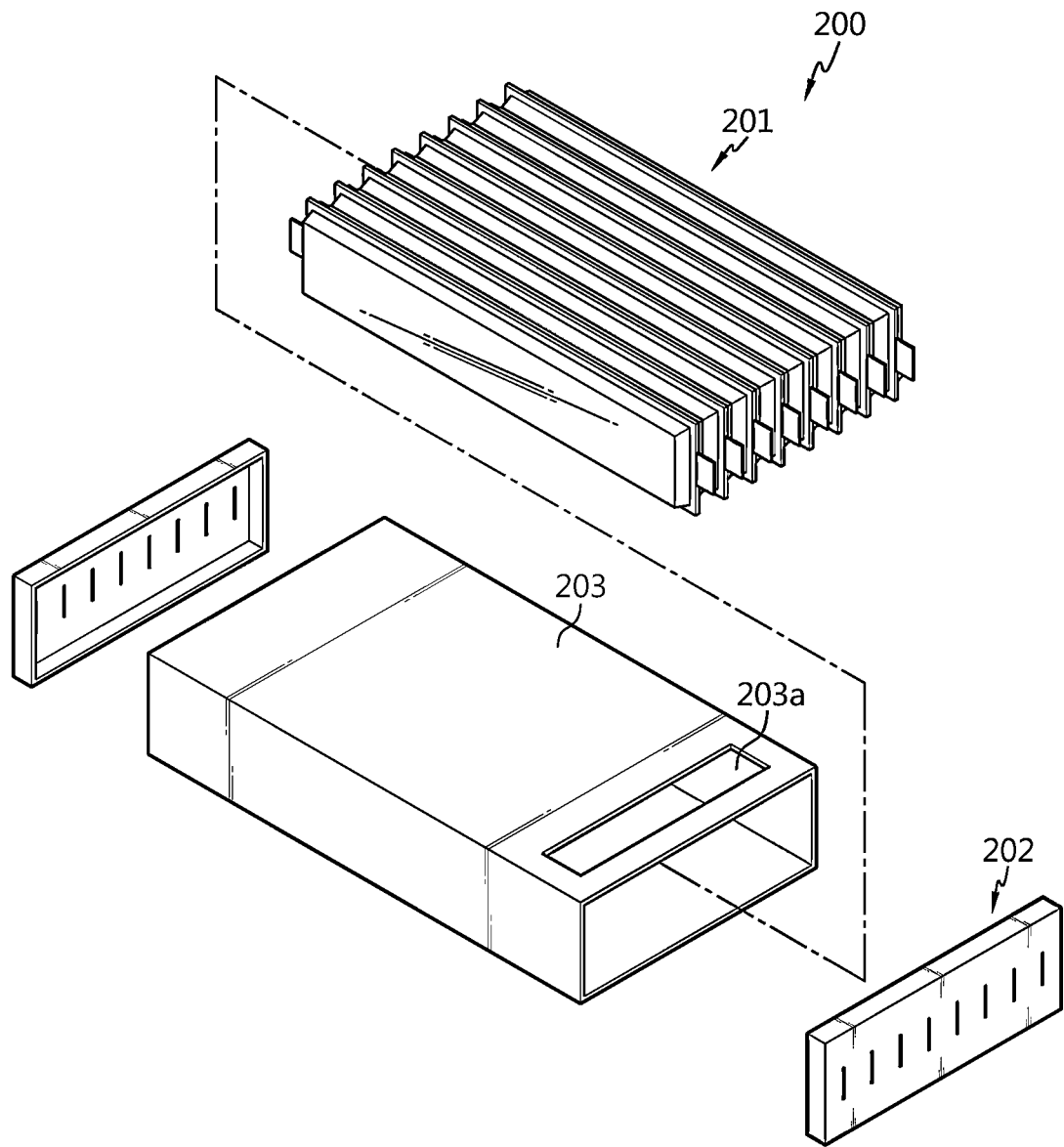
FIG. 5 is a diagram showing a battery module included in the battery pack according to another embodiment of the present disclosure.

FIG. 5 is a diagram showing a battery module included in the battery pack according to another embodiment of the present disclosure.

Referring to FIG. 5, the battery module may further include a module case. The module case 203 may be configured to accommodate at least one battery cell 201. The module case 203 may include a venting hole 203*a*. When a venting gas is generated from the battery cell 201 accommodated in the inner space, the venting hole 203*a* may be configured to discharge the generated venting gas from the inside of the module case 203 to the outside.

Figure 6:
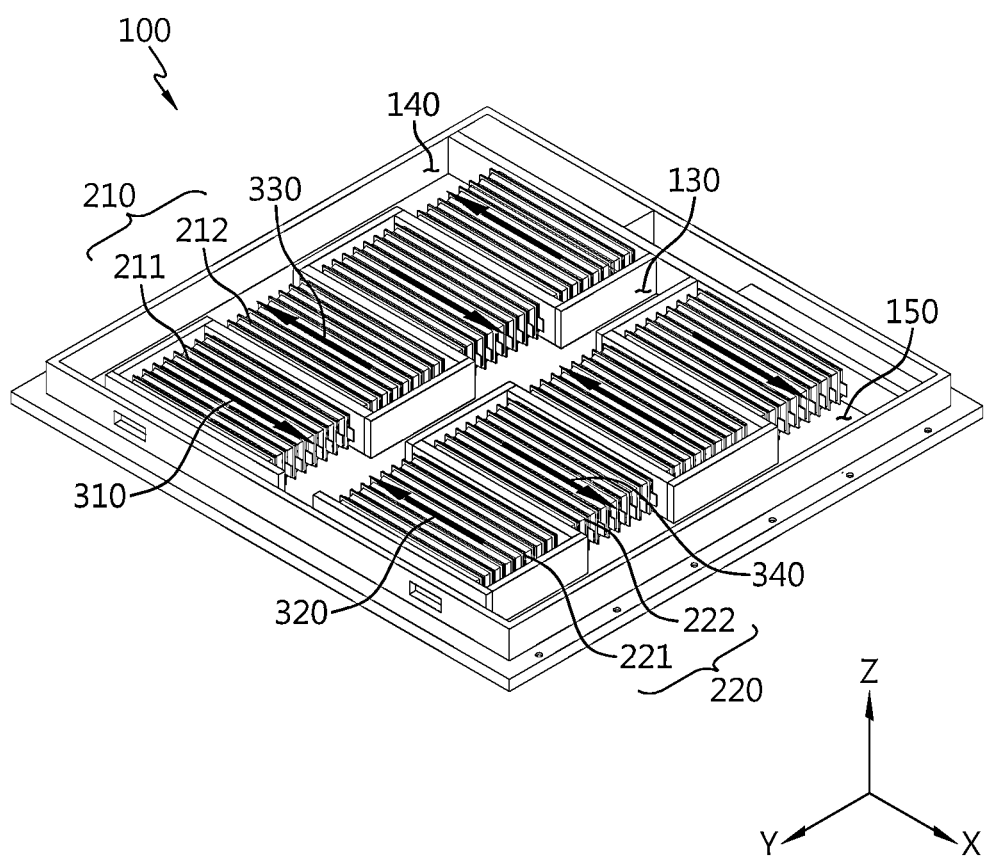
FIG. 6 is a diagram showing a venting channel configured to guide a venting gas in the pack housing included in the battery pack according to an embodiment of the present disclosure.
Figure 7:
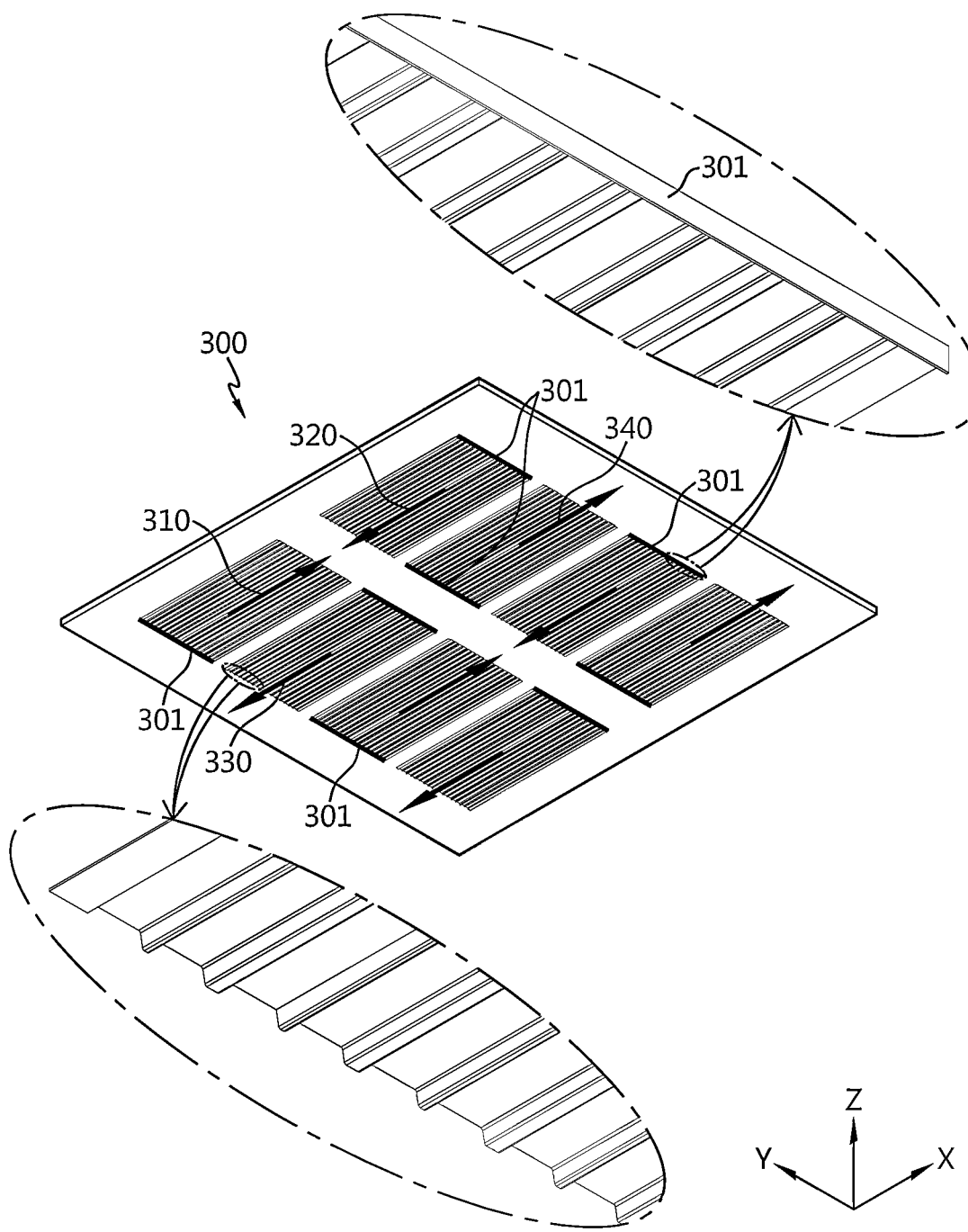
FIG. 7 is a diagram showing a venting channel configured to guide a venting gas in the pack cover included in the battery pack according to an embodiment of the present disclosure.

FIG. 6 is a diagram showing a venting channel configured to guide a venting gas in the pack housing included in the battery pack according to an embodiment of the present disclosure. FIG. 7 is a diagram showing a venting channel configured to guide a venting gas in the pack cover included in the battery pack according to an embodiment of the present disclosure.

Referring to FIGS. 6 and 7, the pack cover 300 may include a first center venting channel 310, a first side venting channel 330, a second center venting channel 320, and a second side venting channel 340. The first center venting channel 310 may be configured to guide a venting gas generated from some battery modules 200 of the first battery module group 210 to the center space 130. The first side venting channel 330 may be configured to guide a venting gas generated from the remaining battery modules 200 of the first battery module group 210 to the first side space 140. The second center venting channel 320 may be configured to guide a venting gas generated from some battery modules 200 of the second battery module group 220 to the center space 130. The second side venting channel 340 may be configured to guide a venting gas generated from the remaining battery modules 200 of the second battery module group 220 to the second side space 150. The pack cover 300 may be coupled with the pack housing 100 to form a venting channel between the upper part of the battery module 200 and the inner surface of the pack cover 300.

However, FIGS. 6 and 7 show one of various embodiments of the present disclosure, and do not limit the present disclosure to have a venting channel as shown in the drawings. The pack cover 300 may be configured to selectively discharge a venting gas generated from each of the plurality of battery modules 200 included in the first battery module group 210 through any one of the first center venting channel 310 and the first side venting channel 330. Similarly, the pack cover 300 may be configured to selectively discharge a venting gas generated from each of the plurality of battery modules 200 included in the second battery module group 220 through any one of the second center venting channel 320 and the second side venting channel 340.

According to this configuration of the present disclosure, it is possible to add a function of controlling the flow of a venting gas by creating a venting channel in the pack cover 300, which is used only for covering the pack housing 100 in a general case. Specifically, according to this configuration of the present disclosure, when a thermal event occurs in each battery module, the flame and venting gas move to the first side space 140, the second side space 150 and the center space 130 along the first center venting channel 310, the first side venting channel 330, the second center venting channel 320 and the second side venting channel 340 formed between the upper part of the battery module 200 and the inner surface of the pack cover 300, whereby the possibility of a thermal event spreading toward adjacent battery modules may be significantly reduced. In addition, the temperature of the venting gas may drop during movement of the venting gas, and even when a flame is generated together with the venting gas, the intensity of the flame may be weakened while moving along the venting channel. Accordingly, it is possible to remove or reduce damage that may occur due to the ejection of high-temperature venting gas and flame to the outside.

The first battery module group 210 may include a first battery module 211 and a second battery module 212 adjacent to each other. The first center venting channel 310 may be configured to guide a venting gas generated from the first battery module 211. The first side venting channel 330 may be configured to guide a venting gas generated from the second battery module 212. In the present disclosure, the first battery module 211 and the second battery module 212 are not intended to describe a specific battery module, but in a pair of battery modules adjacent to each other within the first battery module group 210, it is intended to explain that any one battery module 211 includes the first center venting channel 310 and the other battery module 212 includes the first side venting channel 330.

The second battery module group 220 may include a third battery module 221 and a fourth battery module 222 adjacent to each other. The second center venting channel 320 may be configured to guide a venting gas generated from the third battery module 221. The second side venting channel 340 may be configured to guide a venting gas generated from the fourth battery module 222. The third battery module 221 and the fourth battery module 222 are not intended to describe specific battery modules, but in a pair of battery modules adjacent to each other within the second battery module group 220, it is intended to explain that any one battery module 221 includes the second center venting channel 320 and the other battery module 222 includes the second side venting channel 340.

The first battery module group 210 may include a first battery module 211 and a second battery module 212 adjacent to each other, and the second battery module group 220 may include a third battery module 221 facing the first battery module 211 and a fourth battery module 222 facing the second battery module 212.

Figure 8:
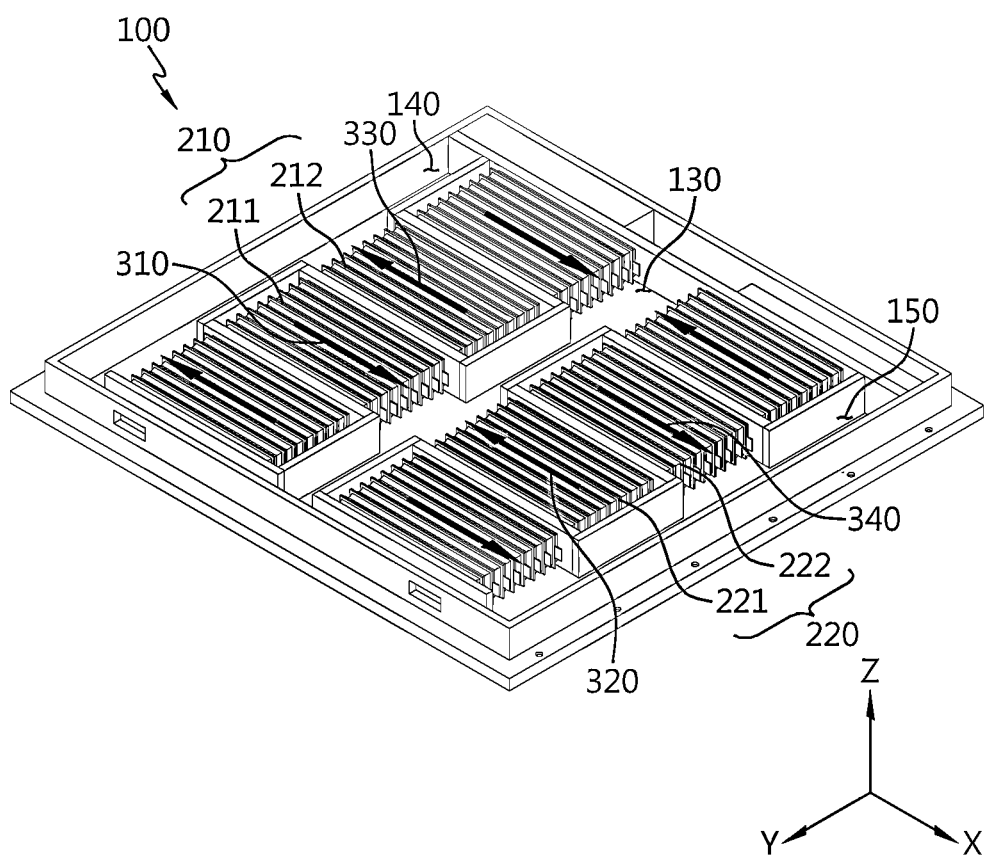
FIG. 8 is a diagram showing a venting channel configured to guide a venting gas in the pack housing included in the battery pack according to another embodiment of the present disclosure.
Figure 9:
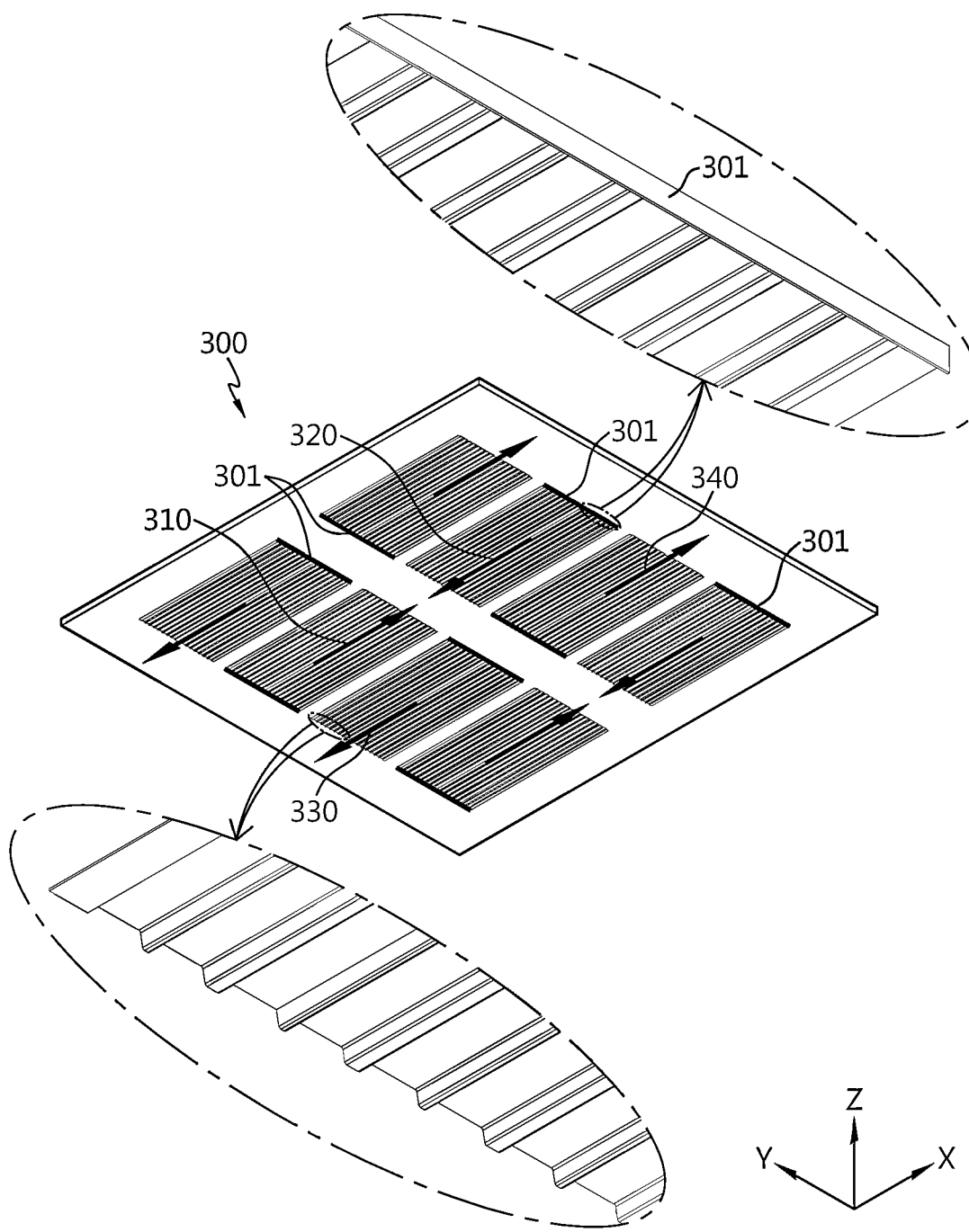
FIG. 9 is a diagram showing a venting channel configured to guide a venting gas in the pack cover included in the battery pack according to another embodiment of the present disclosure.

FIG. 8 is a diagram showing a venting channel configured to guide a venting gas in the pack housing included in the battery pack according to another embodiment of the present disclosure. FIG. 9 is a diagram showing a venting channel configured to guide a venting gas in the pack cover included in the battery pack according to another embodiment of the present disclosure.

Referring to FIGS. 6 to 9, the first center venting channel 310 may be configured to guide a venting gas generated from the first battery module, the second center venting channel 320 may be configured to guide a venting gas generated from the third battery module, the first side venting channel 330 may be configured to guide a venting gas generated from the second battery module, and the second side venting channel 340 may be configured to guide a venting gas generated from the fourth battery module.

If the pack housing 100 and the pack cover 300 shown in FIGS. 6 and 7 are coupled, venting channels that may guide the flow of a venting gas between the first battery module group 210 and the pack cover 300 and between the second battery module group 220 and the pack cover 300 may be formed. If the battery module located at the end of a positive Y-axis direction and the end of a negative X-axis direction is called the first battery module 211, the venting gas generated in the first battery module 211 may move through the first center venting channel 310, and the venting gas generated from the third battery module 221 positioned to face the first battery module 211 may move through the second center venting channel 320. The venting gas generated from the second battery module 212 located adjacent to the first battery module 211 may move through the first side venting channel 330, and the venting gas generated from the fourth battery module 222 located to face the second battery module 212 may move through the second side venting channel 340.

Similar to the above, when the pack housing 100 and the pack cover 300 shown in FIGS. 8 and 9 are coupled, venting channels that may guide the flow of a venting gas between the first battery module group 210 and the pack cover 300 and between the second battery module group 220 and the pack cover 300 may be formed. If the first battery modules 211 located at a second position from the end of the positive Y-axis direction and at the end of the negative X-axis direction is the second battery module, the same venting gas discharge distribution structure as described above with reference to FIGS. 6 and 7 may appear.

In the embodiments shown in FIGS. 6 to 9, the venting channels corresponding to respective neighboring battery modules within the same battery module group are configured not to communicate with each other, and the venting channels belonging to different battery module groups and corresponding to battery modules facing each other, respectively, are configured to communicate with each other. However, the present disclosure is not limited to the number of battery modules.

Figure 10:
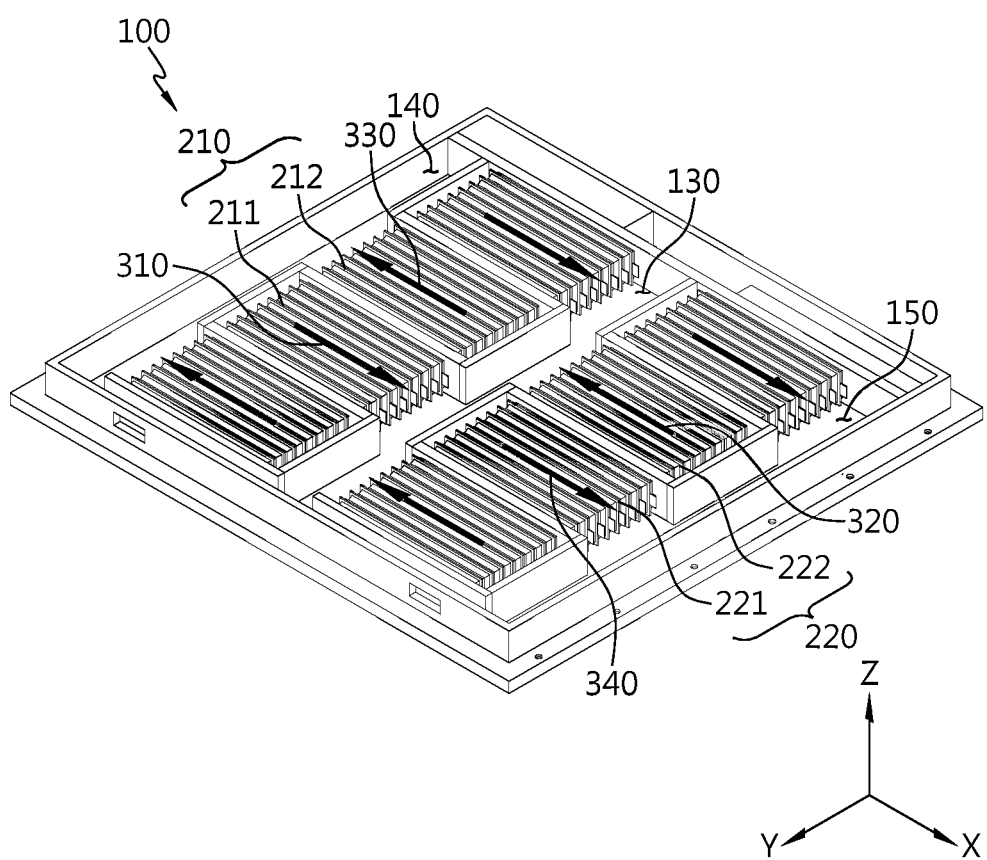
FIG. 10 is a diagram showing a venting channel configured to guide a venting gas in the pack housing included in the battery pack according to another embodiment of the present disclosure.
Figure 11:
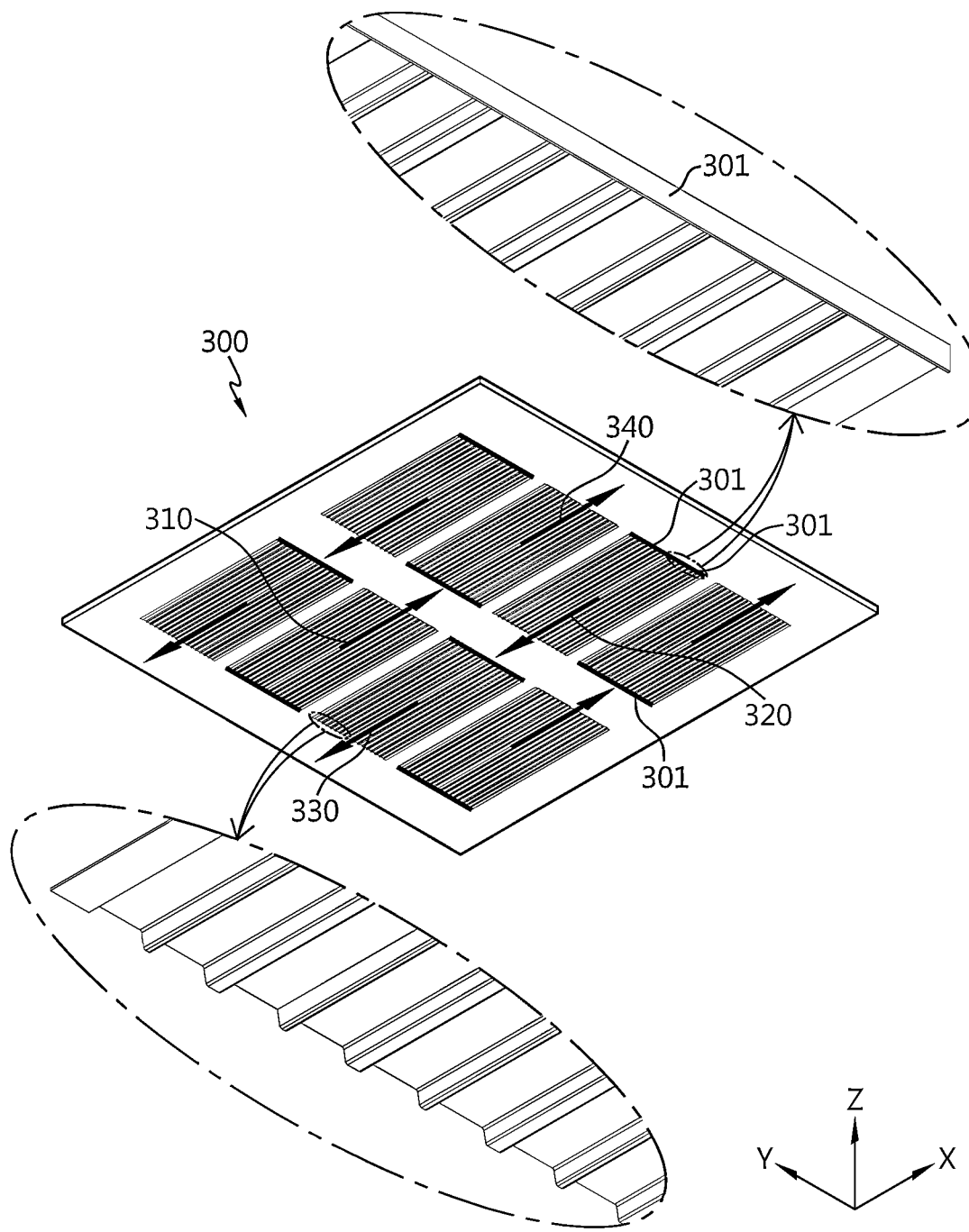
FIG. 11 is a diagram showing a venting channel configured to guide a venting gas in the pack cover included in the battery pack according to another embodiment of the present disclosure.
Figure 12:
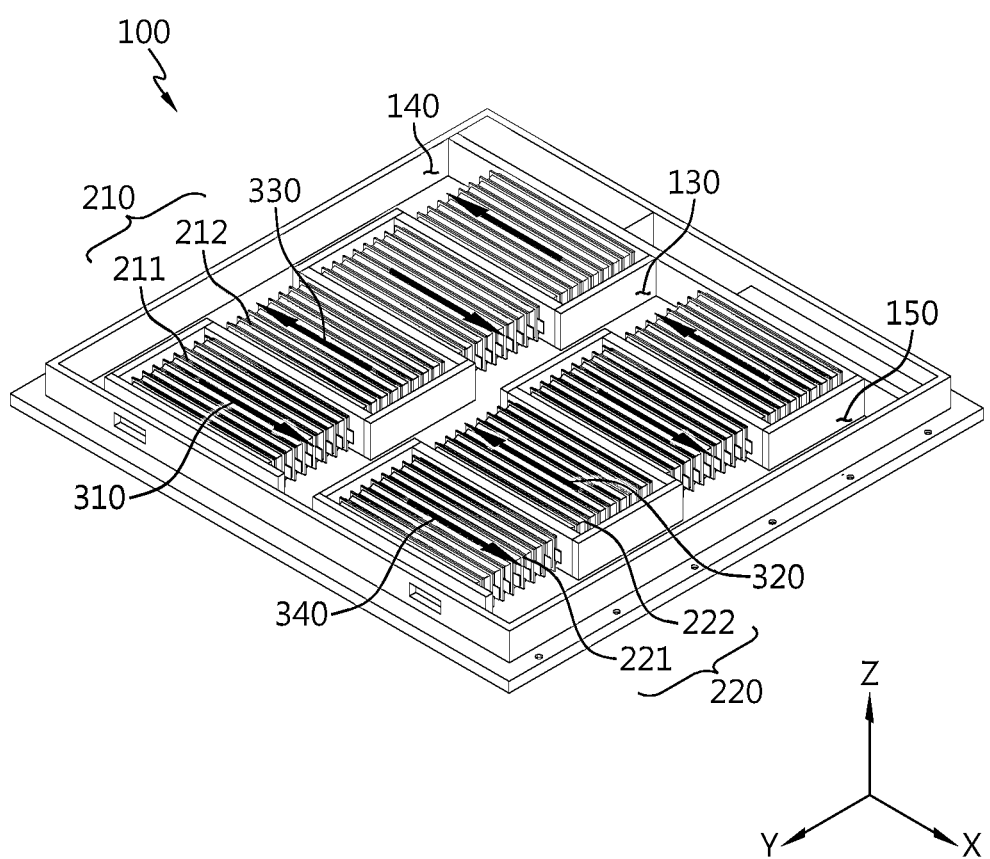
FIG. 12 is a diagram showing a venting channel configured to guide a venting gas in the pack housing included in the battery pack according to another embodiment of the present disclosure.
Figure 13:
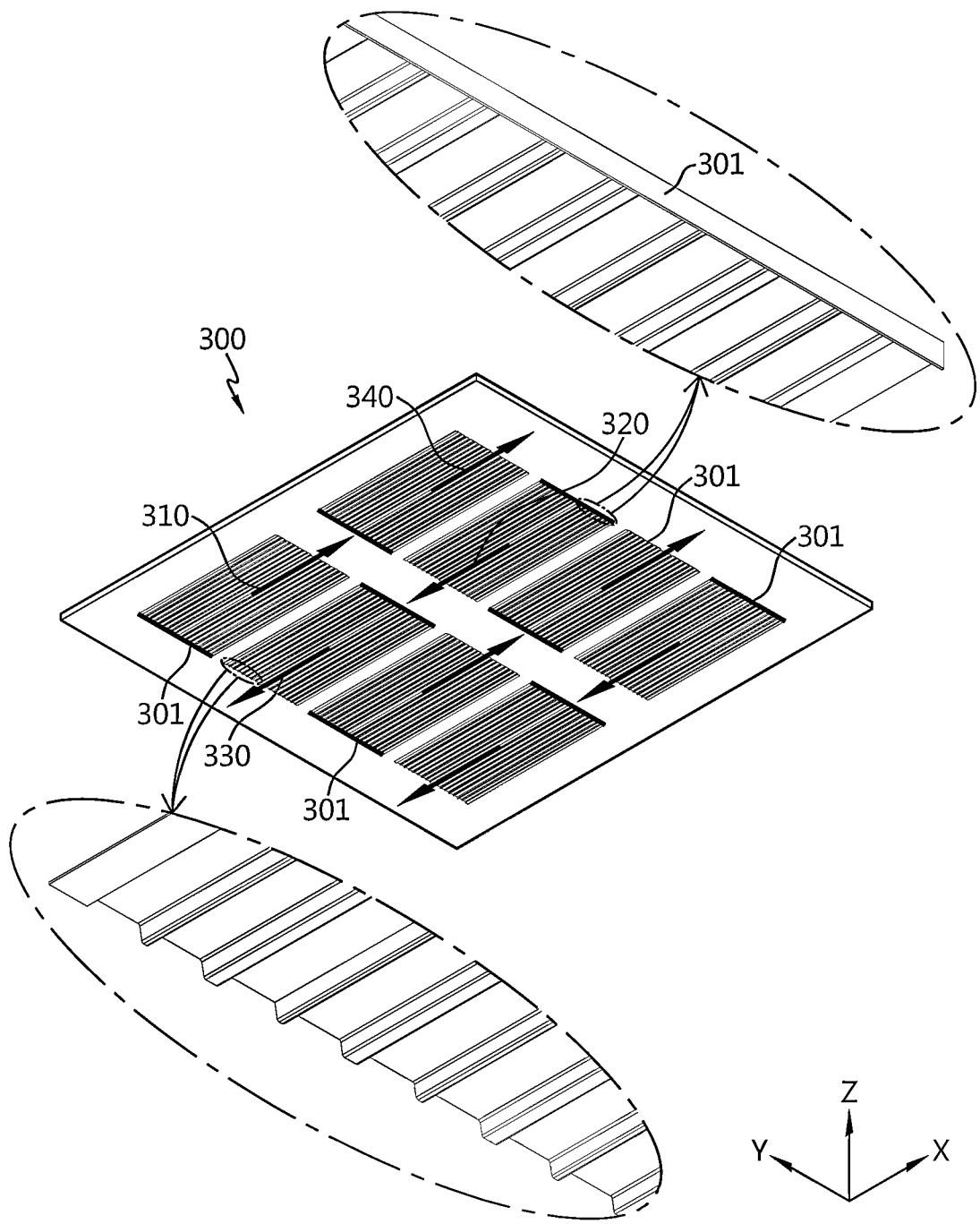
FIG. 13 is a diagram showing a venting channel configured to guide a venting gas in the pack cover included in the battery pack according to another embodiment of the present disclosure.

FIG. 10 is a diagram showing a venting channel configured to guide a venting gas in the pack housing included in the battery pack according to another embodiment of the present disclosure. FIG. 11 is a diagram showing a venting channel configured to guide a venting gas in the pack cover included in the battery pack according to another embodiment of the present disclosure. FIG. 12 is a diagram showing a venting channel configured to guide a venting gas in the pack housing included in the battery pack according to another embodiment of the present disclosure. FIG. 13 is a diagram showing a venting channel configured to guide a venting gas in the pack cover included in the battery pack according to another embodiment of the present disclosure.

Referring to FIGS. 10 to 13, the first center venting channel 310 may be configured to guide a venting gas generated from the first battery module 211, the second side venting channel 340 may be configured to guide a venting gas generated from the third battery module 221, the first side venting channel 330 may be configured to guide a venting gas generated from the second battery module 212, and the second center venting channel 320 may be configured to guide a venting gas generated from the fourth battery module 222.

If the pack housing 100 and the pack cover 300 shown in FIGS. 10 and 11 are coupled, venting channels that may guide the flow of a venting gas between the first battery module group 210 and the pack cover 300 and between the second battery module group 220 and the pack cover 300 may be formed. If the battery module located at a second position from the end of the positive Y-axis direction and at the end of the negative X-axis direction is called the first battery module 211, the venting gas generated from the first battery module 211 may move through the first center venting channel 310, and the venting gas generated from the third battery module 221 located to face the battery module 211 may move through the second side venting channel 340. The venting gas generated from the second battery module 212 located adjacent to the first battery module 211 may move through the first side venting channel 330, and the venting gas generated from the fourth battery module 222 located to face the second battery module 212 may move through the second center venting channel 320.

Similar to the above, if the pack housing 100 and the pack cover 300 shown in FIGS. 12 and 13 are coupled, venting channels that may guide the flow of a venting gas between the first battery module group 210 and the pack cover 300 and between the second battery module group 220 and the pack cover 300 may be formed. If the battery module located at the end of the positive Y-axis direction and the end of the negative X-axis direction is the first battery module 211, the same venting gas discharge distribution structure as described above with reference to FIGS. 10 and 11 may appear.

In the embodiments shown in FIGS. 10 to 13, the venting channels corresponding to neighboring battery modules within the same battery module group, respectively, are configured not to communicate with each other, and venting channels belonging to different battery module groups and corresponding to battery modules facing each other, respectively, are also configured not to communicate with each other. However, the present disclosure is not limited to the number of battery modules.

The pack cover 300 may include a blocking film 301. The blocking film 301 may be provided between a position corresponding to the first side venting channel 330 and the center space 130. In this case, the communication between the first side venting channel 330 and the center space 130 may be blocked. The blocking film 301 may be provided between a position corresponding to the first center venting channel 310 and the first side space 140. In this case, the communication between the first center venting channel 310 and the first side space 140 may be blocked. The blocking film 301 may be provided between a location corresponding to the second side venting channel 340 and the center space 130. In this case, the communication between the second side venting channel 340 and the center space 130 may be blocked. The blocking film 301 may be provided at a position corresponding to the second center venting channel 320 and a position corresponding to the second side space 150. In this case, the communication between the second center venting channel 320 and the second side space 150 may be blocked.

According to this configuration of the present disclosure, by configuring different venting channels for neighboring battery modules within the same battery module group, the effect of high-temperature flame and venting gas generated from adjacent battery modules on each other may be minimized. In configuring the battery pack 10, an effective venting channel may be configured according to the size of the battery pack 10 and the arrangement of the battery modules 200.

Figure 14:
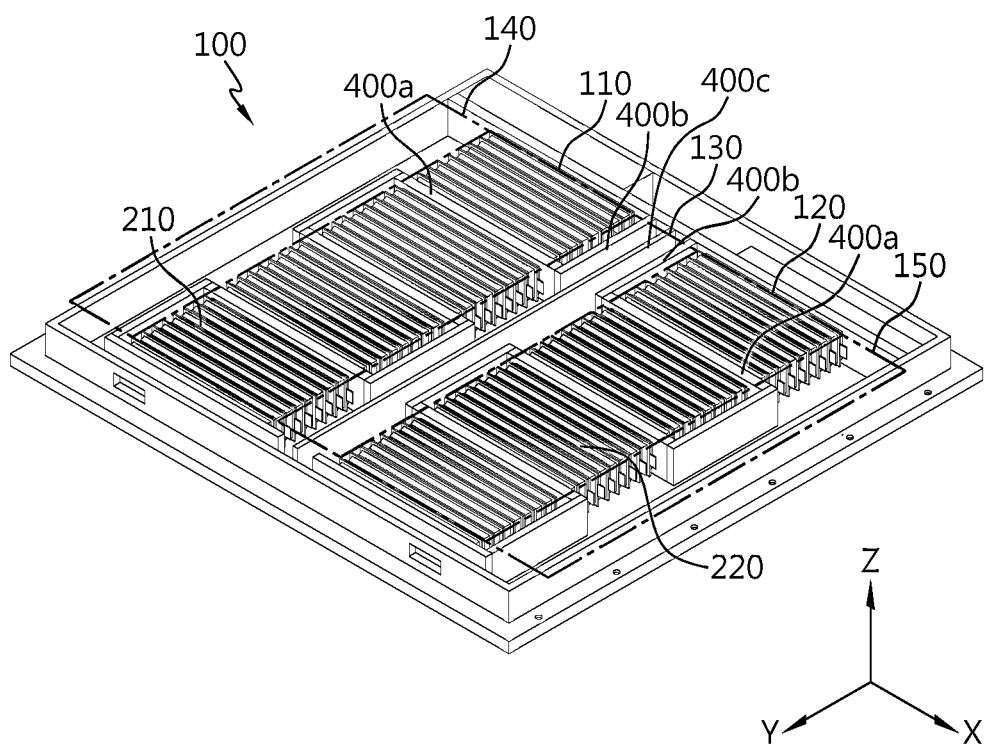
FIG. 14 is a diagram showing a first barrier, a second barrier, and a third barrier included in a battery pack according to another embodiment in the present disclosure.

FIG. 14 is a diagram showing a first barrier, a second barrier, and a third barrier included in a battery pack 10 according to another embodiment in the present disclosure.

Referring to FIG. 14, the battery pack 10 of the present disclosure may include a first barrier 400a. The first barrier 400a may be provided to be disposed at a corresponding position between a pair of battery modules adjacent to each other in the first battery module group 210 and a corresponding position between a pair of battery modules adjacent to each other in the second battery module group 220. The first barrier 400a may be configured to block the movement of a venting gas between accommodating spaces of adjacent battery modules in the first battery module group 210 and the movement of a venting gas between accommodation spaces of adjacent battery modules in the second battery module group 220. The first barrier 400a may be coupled with the pack cover 300 and/or the pack housing 100. The mutual coupling may be performed by welding, bolting, or the like. The first barrier 400a may have an approximate beam shape with an empty inside.

The battery pack 10 of the present disclosure may include a second barrier 400b. The second barrier 400b may be provided between a space corresponding to the first side venting channel 330 and the center space 130 in the inner space of the pack housing 100. The second barrier 400b may be provided between a space corresponding to the first center venting channel 310 and the first side space 140. The second barrier 400b may be provided between a space corresponding to the second side venting channel 340 and the center space 130. The second barrier 400b may be provided at a corresponding position between a space corresponding to the second center venting channel 320 and the second side space 150.

The second barrier 400b may be configured to block the movement of a venting gas between the space corresponding to the first side venting channel 330 and the center space 130, between the space corresponding to the first center venting channel 310 and the first side space 140, between the space corresponding to the second side venting channel 340 and the center space 130, and between the space corresponding to the second center venting channel 320 and the second side space 150 in the inner space of the pack housing. The second barrier 400b may be coupled with the pack cover 300 and/or the pack housing 100. The mutual coupling may be performed by welding, bolting, or the like. The second barrier 400b may have an approximate beam shape with an empty inside.

The first barrier 400a and the second barrier 400b may be configured to be at least partially integrated with each other.

Alternatively, the first barrier 400*a* and the second barrier 400*b* may be manufactured separately and then coupled to each other through welding, bolting, or the like.

According to this configuration of the present disclosure, the movement of a venting gas between the accommodating spaces of battery modules adjacent to each other in the first battery module group 210 and between the accommodation spaces of battery modules adjacent to each other in the second battery module group 220 may be blocked by the first barrier 400*a*. Accordingly, the venting gas moves through the first center venting channel 310, the first side venting channel 330, the second center venting channel 320, and the second side venting channel 340. The venting gas that has moved in this way moves again through the first side space 140, the center space 130, and the second side space 150. During this movement, the temperature of the venting gas may decrease and the intensity of the flame may be weakened. When the first barrier 400*a* and/or the second barrier 400*b* have an approximate beam shape with an empty inner space, the weight may be reduced while maintaining rigidity. The empty space formed in the first barrier 400*a* and/or the second barrier 400*b* may be used as a space for accommodating electrical components required for the battery module. The electrical components may be protected from physical impact by the first barrier 400*a* and/or the second barrier 400*b*.

The battery pack 10 of the present disclosure may include a third barrier 400*c*. The third barrier 400*c* may be configured to prevent direct communication between the first center venting channel 310 and the second center venting channel 320 within the center space 130. The third barrier 400*c* may be coupled with the pack cover 300 and/or the pack housing 100. The mutual coupling may be performed by welding, bolting, or the like. The third barrier 400*c* may have an approximate beam shape with an empty inside. The third barrier 400*c* may have an empty space therein. The empty space formed in the third barrier 400*c* may be used as a passage through which wires connecting battery modules pass. The wires may be protected from physical impact by the third barrier 400*c*.

Figure 15:
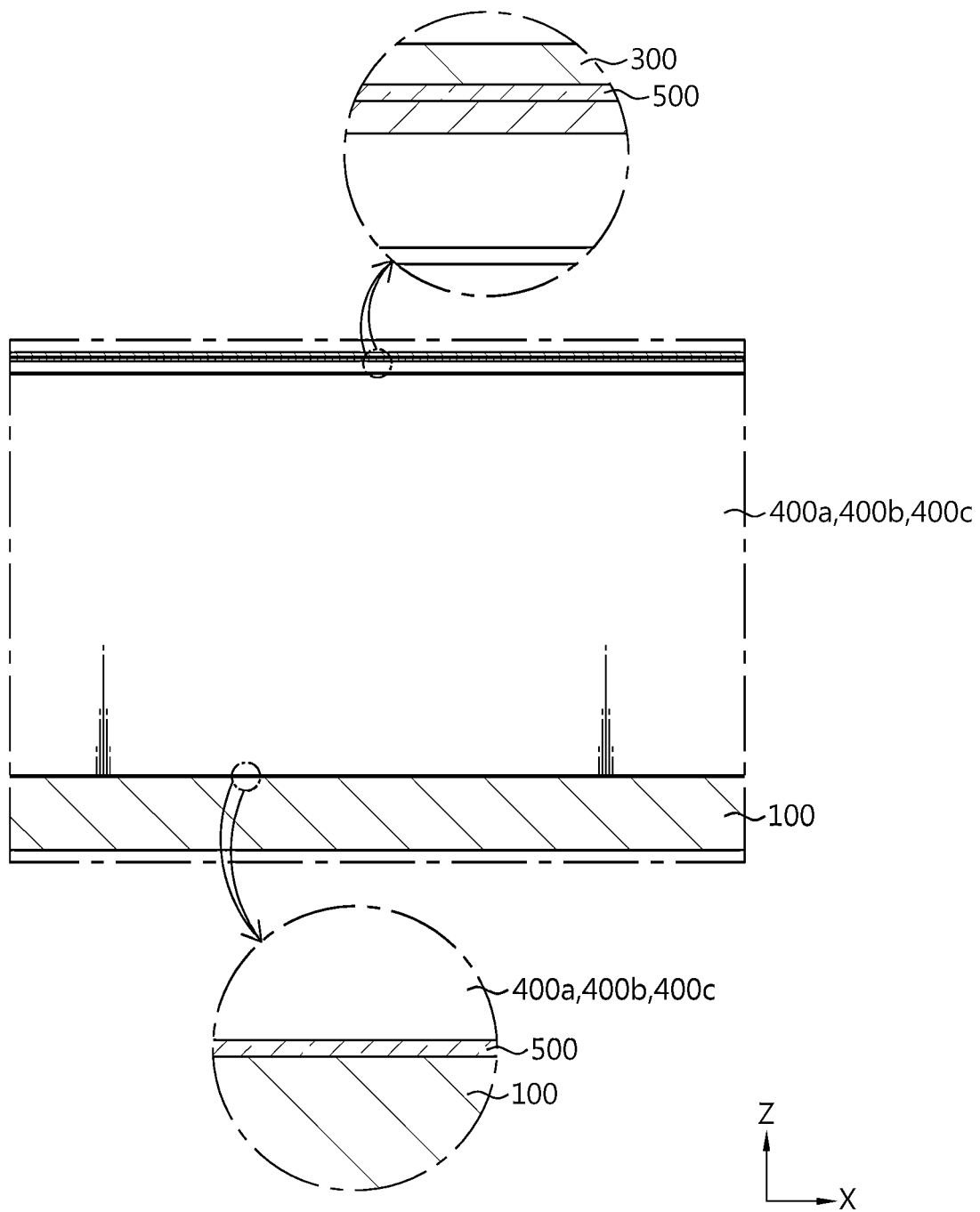
FIG. 15 is a cross-sectional view schematically showing an exemplary shape of a cross-section taken along line A-A' in FIG. 2.

FIG. 15 is a cross-sectional view schematically showing an exemplary shape of a cross-section taken along line A-A' in FIG. 2.

Referring to FIG. 15, the battery pack 10 of the present disclosure may include a sealing member 500. The sealing member 500 may be provided to at least one position between the first barrier 400*a* and the pack cover 300 and between the first barrier 400*a* and the pack housing 100. The sealing member 500 may be provided to at least one position between not only the first barrier 400*a* but also the second barrier 400*b* and/or the third barrier 400*c* and the pack cover 300 and between the second barrier 400*b* and/or the third barrier 400*c* and the pack housing 100. The sealing member 500 may be configured to surround at least a part of the coupling portion between the barrier and the pack cover 300 and/or the pack housing 100.

According to this configuration of the present disclosure, the effect of preventing a venting gas from moving into the gap between the barrier and the pack cover 300 and/or the pack housing 100 may be further improved.

Figure 16:
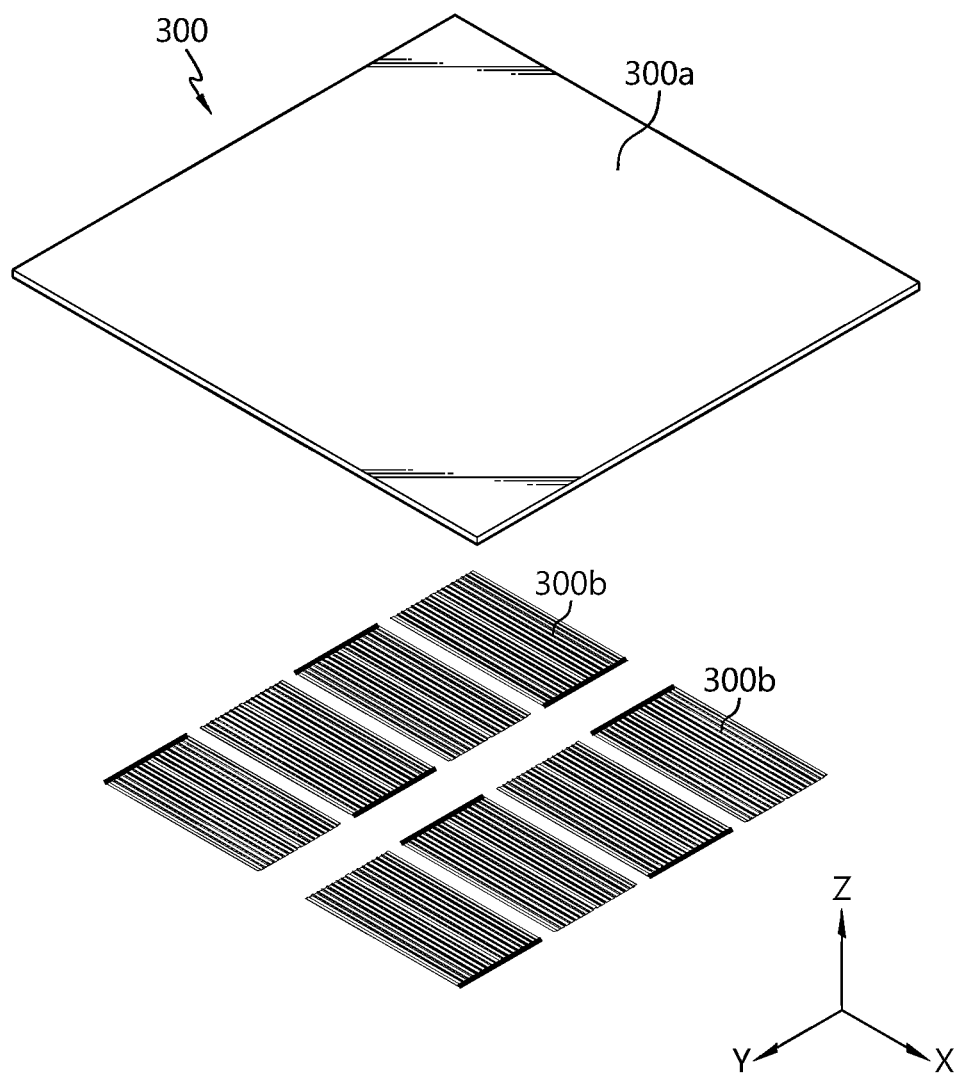
FIG. 16 is a diagram showing a cover plate and a channel plate included in a battery pack according to another embodiment of the present disclosure.

FIG. 16 is a diagram showing a cover plate and a channel plate included in a battery pack according to another embodiment of the present disclosure.

Referring to FIGS. 1 and 16, the pack cover 300 may include a cover plate 300*a* and a channel plate 300*b*. The cover plate 300*a* may cover the accommodation space of the pack housing 100. The channel plate 300*b* may be coupled to the inner surface of the cover plate 300*a*. The channel plate 300*b* may include a first side venting channel 330, a second side venting channel 340, a first center venting channel 310, and a second center venting channel 320. The channel plate 300*b* may be coupled to the inner surface of the cover plate 300*a* at a position corresponding to the battery module. The cover plate 300*a* and the channel plate 300*b* may be at least integrated with each other, and the present disclosure is not limited to a case in which individual plates are separately manufactured and combined. Also, the first center venting channel 310, the first side venting channel 330, the second center venting channel 320, and the second side venting channel 340 may be formed on each plate at a position corresponding to each battery module.

According to this configuration of the present disclosure, when the cover plate 300*a* and the channel plate 300*b* do not have an integrated form but are provided as separate components and combined, the pack cover 300 in a general form without a venting channel may be utilized as it is. When manufacturing the pack cover 300, production efficiency may be increased by separately manufacturing and combining individual plates. On the other hand, when the venting channel is formed on the inner surface of the pack cover 300 as described above, it is possible to minimize the reduction of the accommodation space inside the pack housing 100 due to the formation of the venting channel.

Figure 17:
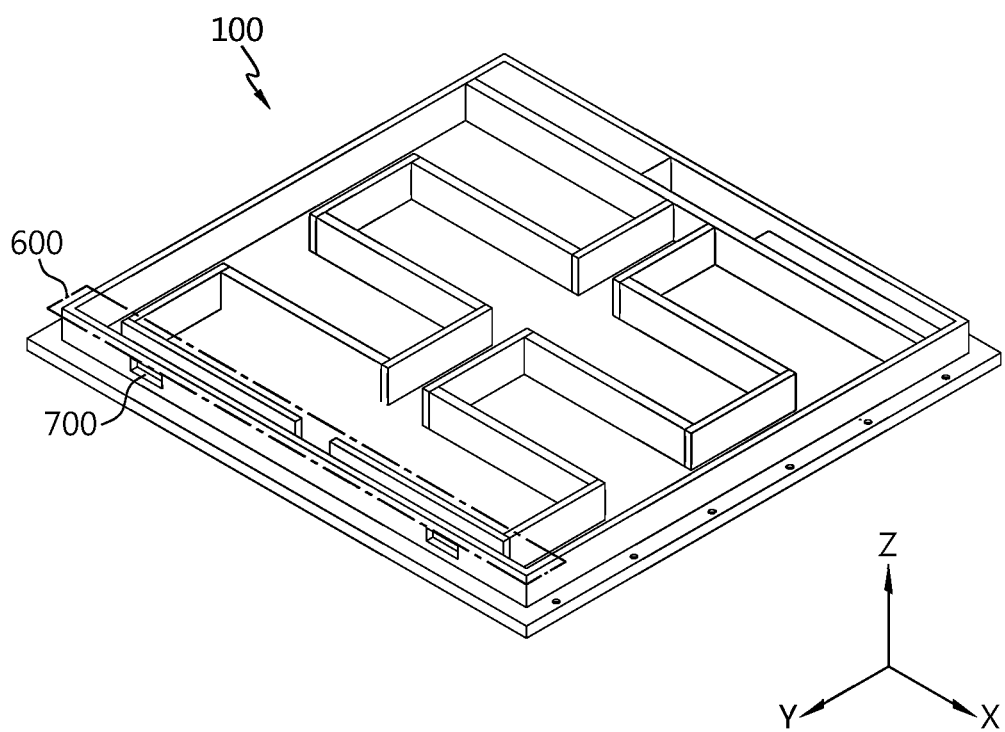
FIG. 17 is a diagram showing a gas collection space and a venting hole included in a battery pack according to an embodiment of the present disclosure.

FIG. 17 is a diagram showing a gas collection space and a venting hole included in a battery pack according to an embodiment of the present disclosure.

Referring to FIG. 17, the pack housing 100 may include a gas collection space 600 formed in at least one of one side and the other side. The gas collection space 600 may communicate with the first side venting channel 330, the second side venting channel 340, the first center venting channel 310, and the second center venting channel 320. The venting gas generated in the battery module may be collected in the first side space 140, the center space 130, and the second side space 150 along the first center venting channel 310, the first side venting channel 330, the second center venting channel 320, and the second side venting channel 340. The venting gas collected in this way may move along the first side space 140, the center space 130, and the second side space 150 and is collected in the gas collection space 600. The gas collection space 600 may communicate with the first side venting channel 330, the second side venting channel 340, the first center venting channel 310, and the second center venting channel 320 through the first side space 140, the center space 130, and the second side space 150. For example, the gas collection space 600 may be provided at an end of the pack housing 100 in the longitudinal direction (positive Y-axis direction). However, the present disclosure is not limited to the shape, location, and number of the gas collection space 600 shown in FIG. 17.

The pack housing 100 may include a venting device 700 so that the venting gas in the gas collection space 600 may be discharged to the outside of the pack housing 100. The venting device 700 is formed to penetrate the pack housing 100 and may be in the form of a simple hole. In addition, the venting device 700 may be a specific device that not only has a completely open form, but also has a form not completely open, but is closed in a normal state and may be opened according to a change in pressure or temperature.

According to this configuration of the present disclosure, when the internal pressure of the battery pack 10 increases since a large amount of gas is generated at once, the internal pressure of the battery pack 10 may be quickly reduced through the gas collection space 600. The gas may be discharged in the intended direction through the venting device 700, and even if a lot of venting gas is instantaneously generated, the gas may be discharged more rapidly and smoothly by increasing the processing capacity or number of the venting device 700.

Figure 18:
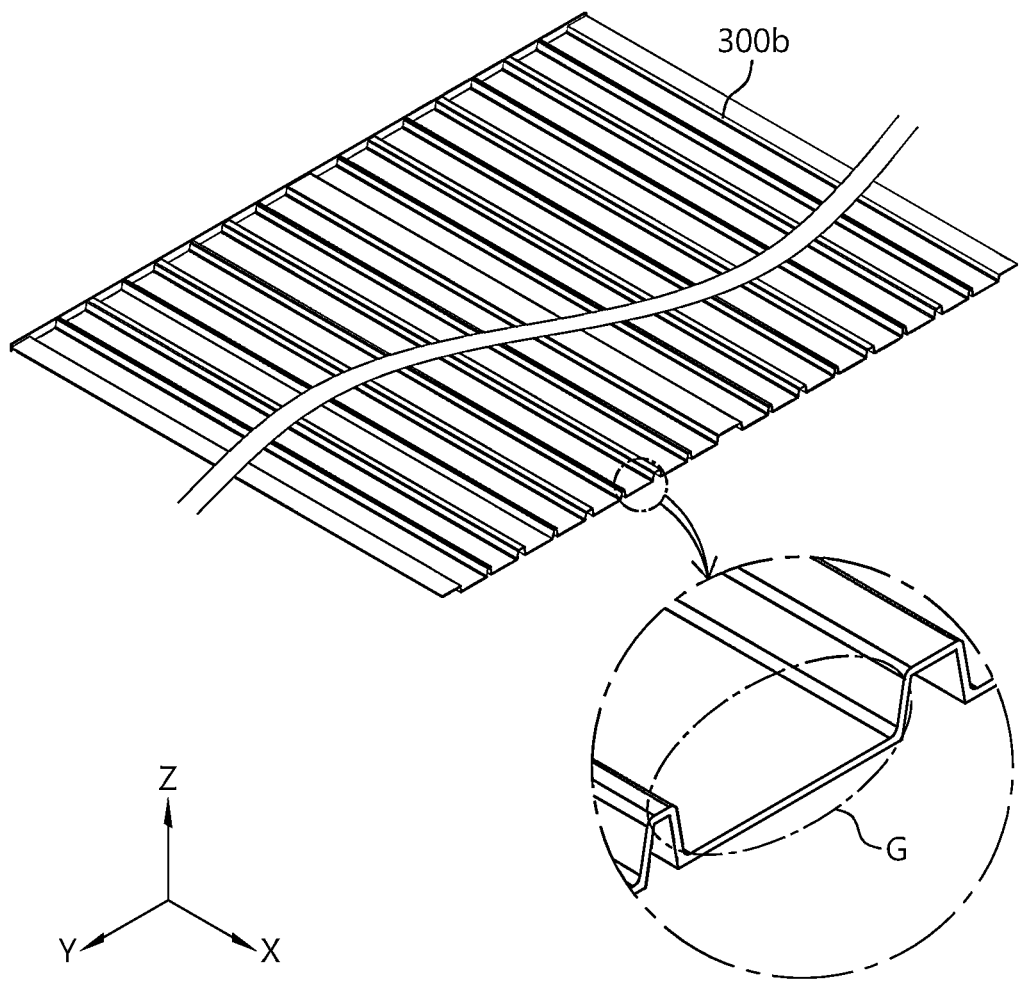
FIG. 18 is a diagram showing a groove provided in a pack cover included in a battery pack according to an embodiment of the present disclosure.

FIG. 18 is a diagram showing a groove provided in a pack cover included in a battery pack according to an embodiment of the present disclosure.

Referring to FIG. 18, the first side venting channel 330, the second side venting channel 340, the first center venting channel 310, and the second center venting channel 320 may have a groove G shape formed on the inner surface of the pack cover 300. The first side venting channel 330, the second side venting channel 340, the first center venting channel 310, and the second center venting channel 320 may have a groove G shape formed on the inner surface of the channel plate 300b. In this case, the surface of the channel plate 300b opposite to the surface on which the groove G is formed may be coupled to the inner surface of the cover plate 300a.

The first side venting channel 330, the second side venting channel 340, the first center venting channel 310, and the second center venting channel 320 may be provided in plurality along the extension direction of the first side venting channel 330 and the second side venting channel 340. To this end, the groove G may be provided in plurality.

According to this embodiment of the present disclosure, space efficiency may be increased in a secondary battery where energy density is important, because the groove G is formed without the need of a separate member for forming a venting channel on the inner surface of the pack cover 300 or the channel plate 300b. Since this configuration may be implemented more easily compared to the case where a separate member for forming a venting channel is coupled to the pack cover 300 or the channel plate 300b, easier production is secured.

Figure 19:
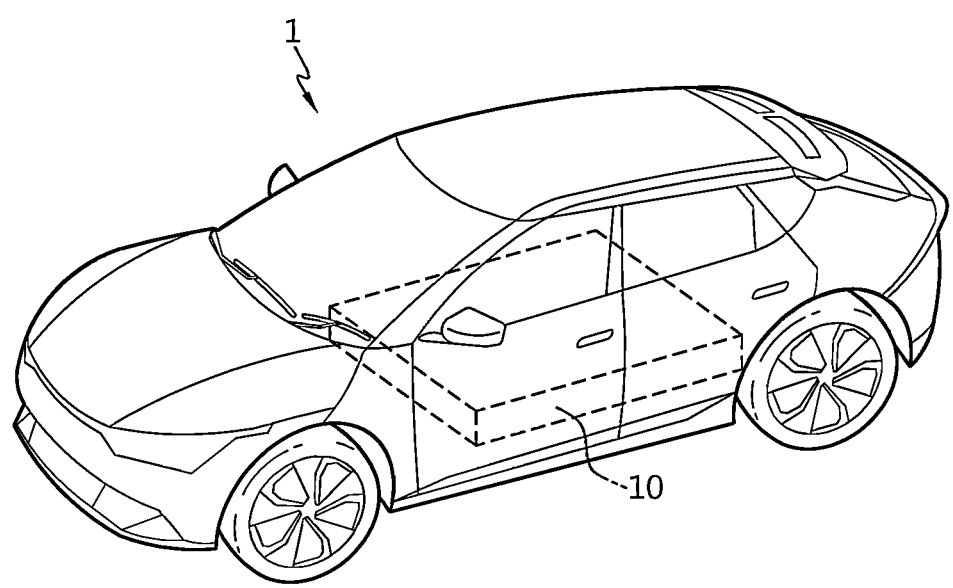
FIG. 19 is a diagram showing a vehicle according to an embodiment of the present disclosure.

FIG. 19 is a diagram showing a vehicle according to an embodiment of the present disclosure.

Referring to FIG. 19, the battery pack 10 according to the present disclosure may be applied to a vehicle 1 such as an electric vehicle or a hybrid vehicle. That is, the vehicle 1 according to the present disclosure may include the battery module according to the present disclosure or the battery pack 10 according to the present disclosure. In addition, the vehicle 1 according to the present disclosure may further include various other components included in a vehicle 1 in addition to the battery module or the battery pack 10. For example, the vehicle 1 according to the present disclosure may further include a vehicle body, a motor, and a control device such as an electronic control unit (ECU), in addition to the battery pack 10 according to the present disclosure.

As described above, the present disclosure has been described based on preferred embodiments with reference to the accompanying drawings, but it is clear that many various and obvious modifications can be made from this description to those skilled in the art without departing from the scope of the present disclosure. Accordingly, the scope of the present disclosure should be construed by the claims described to include such many modified examples.

What is claimed is:

1. A battery pack comprising:
a pack housing having a first accommodation space, a second accommodation space spaced apart from the first accommodation space, a center space formed between the first accommodation space and the second accommodation space, and a first side space spaced apart from the center space and located adjacent to the first accommodation space, and a second side space spaced apart from the center space and located adjacent to the second accommodation space;
a first battery module group including a plurality of battery modules disposed within the first accommodation space;
a second battery module group including a plurality of battery modules disposed within the second accommodation space; and
a pack cover having a first center venting channel configured to guide a venting gas generated from at least two battery modules of the first battery module group to the center space, a first side venting channel configured to guide a venting gas generated from remaining battery modules of the first battery module group to the first side space, and a second center venting channel configured to guide a venting gas generated from at least two battery modules of the second battery module group to the center space, and a second side venting channel configured to guide a venting gas generated from remaining battery modules of the second battery module group to the second side space.

2. The battery pack according to claim 1, wherein the first battery module group includes a first battery module and a second battery module adjacent to each other, and
wherein the first center venting channel is configured to guide a venting gas generated from the first battery module, and the first side venting channel is configured to guide a venting gas generated from the second battery module.

3. The battery pack according to claim 1, wherein the second battery module group includes a third battery module and a fourth battery module adjacent to each other, and
wherein the second center venting channel is configured to guide a venting gas generated from the third battery module, and the second side venting channel is configured to guide a venting gas generated from the fourth battery module.

4. The battery pack according to claim 1, wherein the first battery module group includes a first battery module and a second battery module adjacent to each other, and the second battery module group includes a third battery module facing the first battery module and a fourth battery module facing the second battery module.

5. The battery pack according to claim 4, wherein the first center venting channel is configured to guide a venting gas generated from the first battery module, and the second center venting channel is configured to guide a venting gas generated from the third battery module,
wherein the first side venting channel is configured to guide a venting gas generated from the second battery module, and the second side venting channel is configured to guide a venting gas generated from the fourth battery module, and
wherein the first battery module and third battery module are at an end of the first battery module group and the second battery module group, respectively.

6. The battery pack according to claim 4, wherein the first center venting channel is configured to guide a venting gas generated from the first battery module, and the second side venting channel is configured to guide a venting gas generated from the third battery module,
wherein the first side venting channel is configured to guide a venting gas generated from the second battery module, and the second center venting channel is configured to guide a venting gas generated from the fourth battery module, and wherein the first battery module and third battery module are at an end of the first battery module group and the second battery module group, respectively.

7. The battery pack according to claim 1, further comprising a first barrier between a pair of battery modules adjacent to each other in the first battery module group and between a pair of battery modules adjacent to each other in the second battery module group, respectively.

8. The battery pack according to claim 1, further comprising a second barrier in an inner space of the pack housing between the first side venting channel and the center space, between the first center venting channel and the first side space, between the second side venting channel and the center space, and between the second center venting channel and the second side space, respectively.

9. The battery pack according to claim 1, further comprising a third barrier in the center space configured to prevent direct communication between the first center venting channel and the second center venting channel.

10. The battery pack according to claim 7, wherein the first barrier is configured to block movement of a venting gas between the accommodation spaces of battery modules adjacent to each other in the first battery module group and the movement of a venting gas between the accommodation spaces of battery modules adjacent to each other in the second battery module group.

11. The battery pack according to claim 8, wherein in the inner space of the pack housing, the second barrier is configured to block the movement of a venting gas between the first side venting channel and the center space, between the first center venting channel and the first side space, between the second side venting channel and the center space, and between the second center venting channel and the second side space.

12. The battery pack according to claim 7, wherein a sealing member is provided between the first barrier and at least one of the pack cover and the pack housing.

13. The battery pack according to claim 1, wherein the pack cover includes:
 a cover plate covering the accommodation space of the pack housing; and
 a channel plate coupled to an inner surface of the cover plate and having the first side venting channel, the second side venting channel, the first center venting channel, and the second center venting channel.

14. The battery pack according to claim 1, wherein the pack housing has a gas collection space formed in at least one of a first side and a second side.

15. The battery pack according to claim 14, wherein the gas collection space communicates with the first side venting channel, the second side venting channel, the first center venting channel and the second center venting channel.

16. The battery pack according to claim 14, wherein the pack housing has a vent configured to allow the venting gas in the gas collection space to be discharged to outside of the pack housing.

17. The battery pack according to claim 1, wherein the first side venting channel, the second side venting channel, the first center venting channel and the second center venting channel have a groove shape formed on an inner surface of the pack cover.

18. The battery pack according to claim 13, wherein the first side venting channel, the second side venting channel, the first center venting channel and the second center venting channel each have a groove shape formed on a first surface of the channel plate, and
 wherein a second surface of the channel plate opposite to the first surface on which the groove is formed is coupled on the inner surface of the cover plate.

19. The battery pack according to claim 1, wherein the first side venting channel, the second side venting channel, the first center venting channel and the second center venting channel are provided in plurality along an extension direction of the first side space and the second side space, respectively.

20. A vehicle, comprising the battery pack according to claim 1.

21. The battery pack according to claim 1, wherein the battery modules of the first battery module group are spaced from each other in a first direction,
 wherein the battery modules of the second battery module group are spaced from each other in the first direction,
 wherein the first battery module group and the second battery module group are spaced from each other in a second direction, and
 wherein battery modules of the first battery module group and the second battery module group opposite each other in the second direction vent in opposite directions.

22. The battery pack according to claim 1, wherein the battery modules of the first battery module group are spaced from each other in a first direction,
 wherein the battery modules of the second battery module group are spaced from each other in the first direction,
 wherein the first battery module group and the second battery module group are spaced from each other in a second direction, and
 wherein battery modules of the first battery module group and the second battery module group opposite each other in the second direction vent in a same direction.

23. The battery pack according to claim 1, further comprising:
 a first serpentine divider extending through the plurality of battery modules of the first battery module group; and
 a second serpentine divider extending through the plurality of battery modules of the second battery module group.

* * * * *